United States Patent [19]

Stengel et al.

[11] Patent Number: 5,303,411
[45] Date of Patent: Apr. 12, 1994

[54] RECEIVER SENSITIVITY THRESHOLD EXTENDED WITH THE COMBINATION OF AN UNMODULATED SIGNAL WITH THE RECEIVED SIGNAL

[75] Inventors: Robert E. Stengel, Ft. Lauderdale; Paul D. Marko, Pembroke Pines, both of Fla.

[73] Assignee: Motorola, Inc., Schaumburg, Ill.

[21] Appl. No.: 883,820

[22] Filed: May 11, 1992

Related U.S. Application Data

[63] Continuation of Ser. No. 728,861, Jul. 11, 1991, abandoned, which is a continuation of Ser. No. 343,320, Apr. 26, 1989, abandoned.

[51] Int. Cl.$^5$ .............................................. H04B 1/10
[52] U.S. Cl. ..................................... 455/254; 455/209; 455/296
[58] Field of Search ............... 455/226.2, 226.3, 197.1, 455/200.1, 212, 219, 236.1, 247.1, 250.1, 251.1, 255, 231, 234.1, 235.1, 295, 296, 305, 304, 254, 209

[56] References Cited

U.S. PATENT DOCUMENTS

| | | | |
|---|---|---|---|
| 3,147,440 | 9/1964 | Benton | 455/305 |
| 3,588,705 | 6/1971 | Paine et al. | 325/348 |
| 3,983,488 | 9/1976 | Bush et al. | 325/346 |
| 4,270,222 | 5/1981 | Menent | 455/318 |
| 4,272,846 | 6/1981 | Muratani et al. | 455/304 |
| 4,339,829 | 7/1982 | Dimon | 455/234 |
| 4,380,824 | 4/1983 | Inoue | 455/219 |
| 4,672,632 | 6/1987 | Andersen | 375/57 |

OTHER PUBLICATIONS

Taub & Schilling, "Principles of Communication Systems", 1986, pp. 394-397, McGraw-Hill, New York.

Primary Examiner—Reinhard J. Eisenzopf
Assistant Examiner—Edward Urban
Attorney, Agent, or Firm—Juliana Agon

[57] ABSTRACT

A receiver (10) is provided where an information signal (11) is received (12) and examined to determine (20) its signal strength. When the signal strength is at least equal to a threshold, an unmodulated signal (40) is added to the received signal to improve the sensitivity of the receiver.

18 Claims, 1 Drawing Sheet

RECEIVER SENSITIVITY THRESHOLD EXTENDED WITH THE COMBINATION OF AN UNMODULATED SIGNAL WITH THE RECEIVED SIGNAL

This is a continuation of application Ser. No. 07/728,861 filed Jul. 11, 1991, now abandoned, which was a continuation of application Ser. No. 07/343,320 filed Apr. 26, 1989, also now abandoned.

TECHNICAL FIELD

This invention relates generally to radio frequency receivers and more particularly to receivers with sensitivity improvement.

BACKGROUND ART

One measure of a receivers performance is its ability to reject noise while providing a clear desired signal. Typically, this performance is rated by a signal-to-noise ratio. The higher the signal-to-noise ratio, the better the sensitivity (and performance) of the receiver.

Others skilled in the art have used complicated detector and compensation arrangements that attempt to improve the receivers sensitivity. However, existing receiver sensitivity improvement techniques (such as "click swallowing") do not function well when the desired information signal has a received amplitude that is near the noise level. This noise barrier resides approximately below a 3 dB signal-to-noise ratio, which is often called the noise range. Therefore, a need exists for a simple method to improve the receiver's sensitivity below the noise range.

SUMMARY OF THE INVENTION

Accordingly, it is an object of the present invention to improve sensitivity to a receiver when the information signal is near the noise level.

Briefly, according to the invention an information signal is received and examined to determine its signal strength. When the signal strength is at least equal to a threshold, an unmodulated signal is added to the received signal to improve the sensitivity of the receiver.

DETAILED DESCRIPTION OF THE PREFERRED EMBODIMENT

Figure 1:
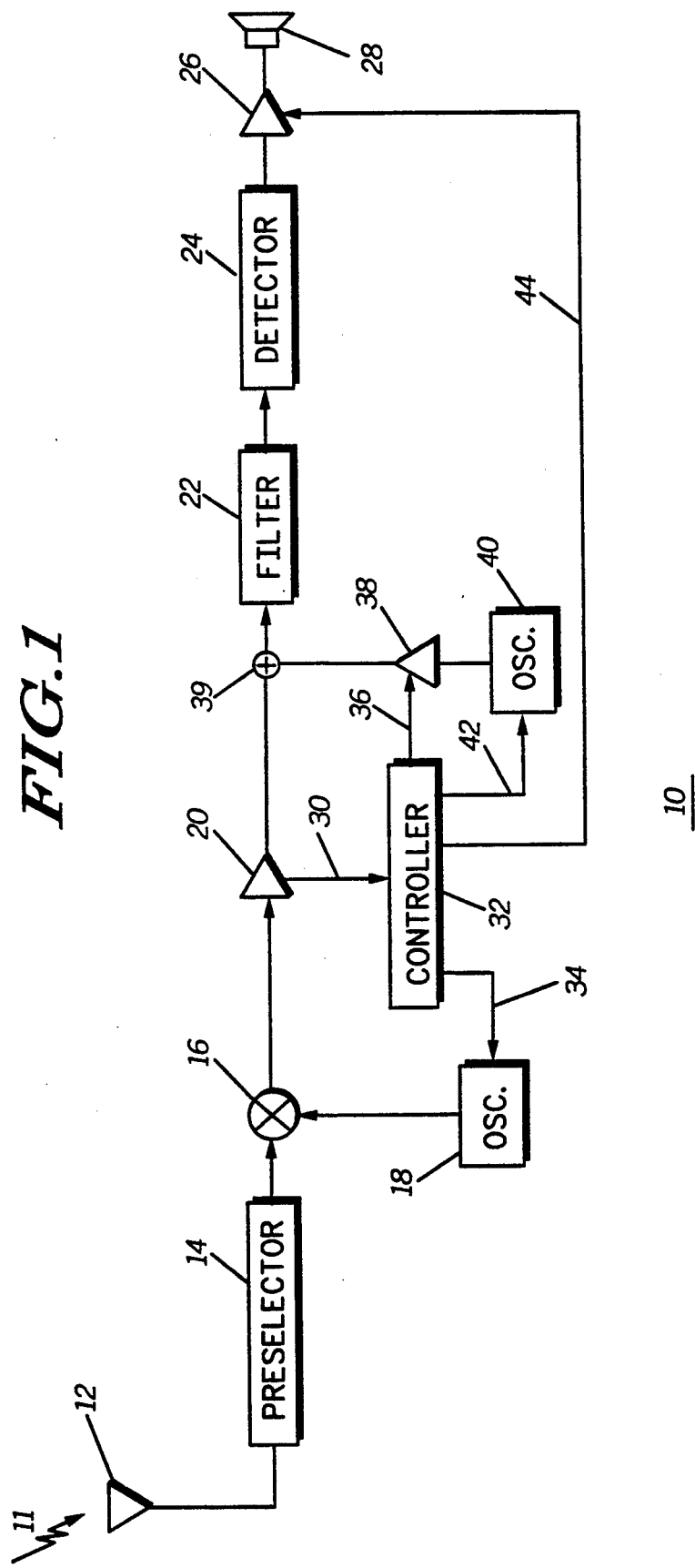
FIG. 1 is a block diagram of a receiver in accordance with the present invention.

Referring to FIG. 1, a receiver 10 is shown having an information signal 11 being received by an antenna 12. The received information signal (and received noise) is filtered (bandlimited) via a preselector 14 before being mixed (mixer 16) with an injection signal from an oscillator 18. The oscillator 18 is programmed (34) to provide a suitable injection signal by a controller 32 so that a desired information signal can be received. The mixer 16 provides an intermediate frequency (IF) signal to an IF amplifier 20 to be amplified prior to being filtered by an IF filter 22. The filtered signal is processed by a detector 24 to provide a recovered signal. It will be appreciated that an additional intermediate frequency stage can be added before the mixer 16 along with additional bandpass filters. The detected or recovered signal is amplified in an optional audio amplifier 26 before being presented via a speaker 28.

According to the present invention, the signal or carrier strength of the desired received IF signal (processed at the IF frequency) is determined and compared to a signal threshold. Preferably, signal strength detection is accomplished in the IF amplifier 20, which has a receiver signal strength indicator (RSSI) output. Preferably, the IF amplifier 20 comprises an MC 3362 manufactured by Motorola Inc. or its functional equivalent.

The present invention adds an unmodulated signal to the received IF signal when the received IF signal is below a predetermined signal threshold (which may be set at the 3 dB signal-to-noise ratio). If the RSSI output (30) indicates that the received IF signal is at or below the signal threshold (set 3 dB approximately above the noise level), the controller 32 programs (42) the frequency of another oscillator 40 to produce the unmodulated signal. Having its frequency set at the same frequency of the received IF signal, the unmodulated signal is amplified in an amplifier 38 controlled by the controller 32 (via line 36) before being added (summed 39) to the received IF signal at the input to the filter 22. The gain of the amplifier 38 is set (36) such that the amplitude of the unmodulated carrier signal is preferably at least 5 dB above the signal threshold (which is set 3 dB approximately above the noise level) or 8 dB above the noise level. It will appreciated that the summing node 39 may occur before or after the filter 22.

To compensate for the suppression of the desired signal due to the injection of the unmodulated signal, additional amplification is provided by the audio amplifier 26 by adjusting (44) its gain. The injection of the unmodulated signal suppresses the noise more than the desired signal when the received signal's amplitude resides at a level below the signal threshold. As a result, the recovered signal has a much greater signal-to-noise ratio. Therefore, sensitivity of the receiver improves. It is to be appreciated that the unmodulated signal could be added with the received signal before the preselector 14, the mixer 16 of anywhere else after the antenna 12 and before the detector 24 to obtain the same benefits of an improved receiver sensitivity.

What is claimed is:

1. A method of receiving an information signal, comprising the steps of:
   receiving said information signal;
   mixing an injection signal, at an input injection node of a mixer, with said information signal to provide a received FM signal having a first signal-to-noise ratio, at the output of the mixer;
   determining when said received FM signal has a signal strength below a signal threshold; and
   adding an unmodulated signal, to a detector input of an FM detector, said unmodulated signal having a frequency substantially the same as the frequency of said received FM signal, at the output of the mixer, but different from the frequency of the injection signal, at said injection node, said unmodulated signal added with said received FM signal, when said signal strength is below said signal threshold, to increase the FM detector output signal amplitude for an improved FM receiver sensitivity of said information signal, in order to provide a greater signal-to-noise ratio than said first signal-to-noise ratio.

2. The method of claim 1, further comprising the step of controlling a gain of an amplifier stage in response to said step (b).

3. The method of claim 1, further comprising the step of detecting said received signal and said unmodulated signal to provide an output signal.

4. The method of claim 3, further comprising the step of amplifying said output signal.

5. The method of claim 1, further comprising the step of synthesizing a frequency of said unmodulated signal.

6. The method of claim 1, wherein said signal threshold is set approximately at the 3 dB signal-to-noise ratio.

7. The method of claim 6, wherein said amplitude of said unmodulated signal is amplified approximately 5 dB above said signal threshold.

8. The method of claim 1, further comprising the step of amplifying an amplitude of said unmodulated signal.

9. A radio receiver, comprising:
means for receiving an FM information signal;
a first oscillator for providing an injection signal;
a mixer having an injection node for mixing said injection signal with said FM information signal to provide a received intermediate frequency (IF) signal having a first signal-to-noise ratio, at the output of the mixer;
means for determining when said received signal has a signal strength below a signal threshold;
an FM detector having an input and an output for providing an FM detector output signal from the input signal detected at the input;
a second oscillator for providing an unmodulated IF signal having a frequency substantially the same as the frequency of said received IF signal, at the output of the mixer, but different from the frequency of the injection signal of said first oscillator at said injection node; and
summing means for adding, to the input of said detector of said receiver, said unmodulated additive signal having a frequency substantially the same as the frequency of said received IF signal, at the output of the mixer, but different from the frequency of the injection signal at said injection node, said unmodulated signal added with said received signal, when said signal strength is below said signal threshold, to increase the FM detector output signal amplitude for an improved FM receiver sensitivity of said received FM information signal, in order to provide a greater signal-to-noise ratio than said first signal-to-noise ratio.

10. The receiver of claim 9, further comprising means for controlling a gain of an amplifier portion of said receiver as a function of response to said signal strength.

11. The receiver of claim 9, further comprising means for detecting said received signal and said unmodulated signal to provide an output signal.

12. The receiver of claim 11, further comprising means for amplifying said output signal.

13. The receiver of claim 9, further comprising means for programming a frequency source to provide said unmodulated signal.

14. The receiver of claim 9, wherein said signal threshold is set approximately at the 3 dB signal-to-noise ratio.

15. The receiver of claim 9, further comprising means for amplifying an amplitude of said unmodulated signal.

16. The receiver of claim 9 wherein said unmodulated additive signal is added anywhere between an antenna and said detector of said receiver.

17. The receiver of claim 14, wherein said amplitude of said unmodulated signal is amplified approximately 5 dB above said signal threshold.

18. A receiver for receiving an FM information signal, comprising:
means for receiving said FM information signal;
a first oscillator for providing an injection signal;
a mixer having an injection node for mixing said injection signal with said FM information signal to provide a received intermediate frequency (IF) signal having a first signal-to-noise ratio, at the output of the mixer;
means for determining when said received IF signal has a signal strength below a signal threshold;
an FM detector having an input and an output for providing an FM detector output signal from the input signal detected at the input, the detector tuned to the intermediate frequency;
a second oscillator for providing an unmodulated IF signal having a frequency substantially the same as the frequency of said received IF signal, at the output of the mixer, but different from the frequency of the injection signal of said first oscillator at said injection node; and
summing means for adding, to the input of said detector of said receiver, said unmodulated IF signal having a frequency substantially the same as the frequency of said received IF signal to said received IF signal when said signal strength is below said signal threshold, to increase the FM detector output signal amplitude for an improved FM receiver sensitivity of said FM information signal, in order to provide a greater signal-to-noise ratio than said first signal-to-noise ratio by suppressing the noise more than the signal.

* * * * *